May 27, 1958 W. C. WINTRODE ET AL 2,836,772

ELECTRONIC COMPONENT MOUNTING ASSEMBLY

Filed May 12, 1955 2 Sheets-Sheet 1

INVENTOR.
WARNER C. WINTRODE
LEON H. BISHOP
BY Robert C. Smith
ATTORNEY

ELECTRONIC COMPONENT MOUNTING ASSEMBLY

Filed May 12, 1955 2 Sheets-Sheet 2

INVENTOR.
WARNER C. WINTRODE
LEON H. BISHOP
BY
Robert C. Smith
ATTORNEY 2,836,772
Patented May 27, 1958

2,836,772

ELECTRONIC COMPONENT MOUNTING ASSEMBLY

Warner C. Wintrode and Leon H. Bishop, South Bend, Ind., assignors to Bendix Aviation Corporation, South Bend, Ind., a corporation of Delaware Application May 12, 1955, Serial No. 507,844

6 Claims. (Cl. 317—101)

This invention relates to assemblies for mounting of electrical components and, more particularly, to a method of mounting subminiature tubes and associated components.

Miniaturization of electronic circuits has become increasingly important as the number of control functions required of a given system has increased. This is particularly important in the aircraft industry where it is desired to automatically control greater and greater numbers of variables while at the same time holding weight to a minimum. Two of the recent developments which aid in accomplishing the desired miniaturization are the subminiature tube and the printed circuit. The comparatively recent development of techniques for molding of electrical components has also been instrumental in reducing the required size and weight of electrical circuitry. Various problems have been introduced, however, by the use of the techniques which have reduced their usefulness. One such problem is that subminiature tubes may be required to dissipate substantially as much heat as similar tubes of larger design. Consequently, they will normally run rather high surface temperatures unless some provision is made to provide adequate means for transferring heat. The problem becomes increasingly severe as ventilation is restricted which occurs when the tubes are molded along with their associated components into a solid plastic unit. An additional shortcoming presented by this technique is that a single defective component may make it necessary to replace an entire unit. It is, therefore, an object of the present invention to product a plug-in unit which allows the electrical components in said circuit to remain available for servicing and replacement without the necessity for damaging the plastic or discarding the entire unit.

It is another object to provide a plug-in unit in which the tubes and other components are effectively protected against damage from vibration and which provides for unusually good heat dissipation.

It is another object to provide a unit which will accomplish the above objectives and yet is easily adaptable to mass production methods of construction and subassembly.

It is another object to provide a plug-in unit which will accomplish the above objectives and which is adaptable to a great number of circuit and terminal requirements.

Other objects and advantages will become apparent from examination of the following specification taken in connection with the accompanying drawings in which.

Figures 1, 2, 3, 4, 5:
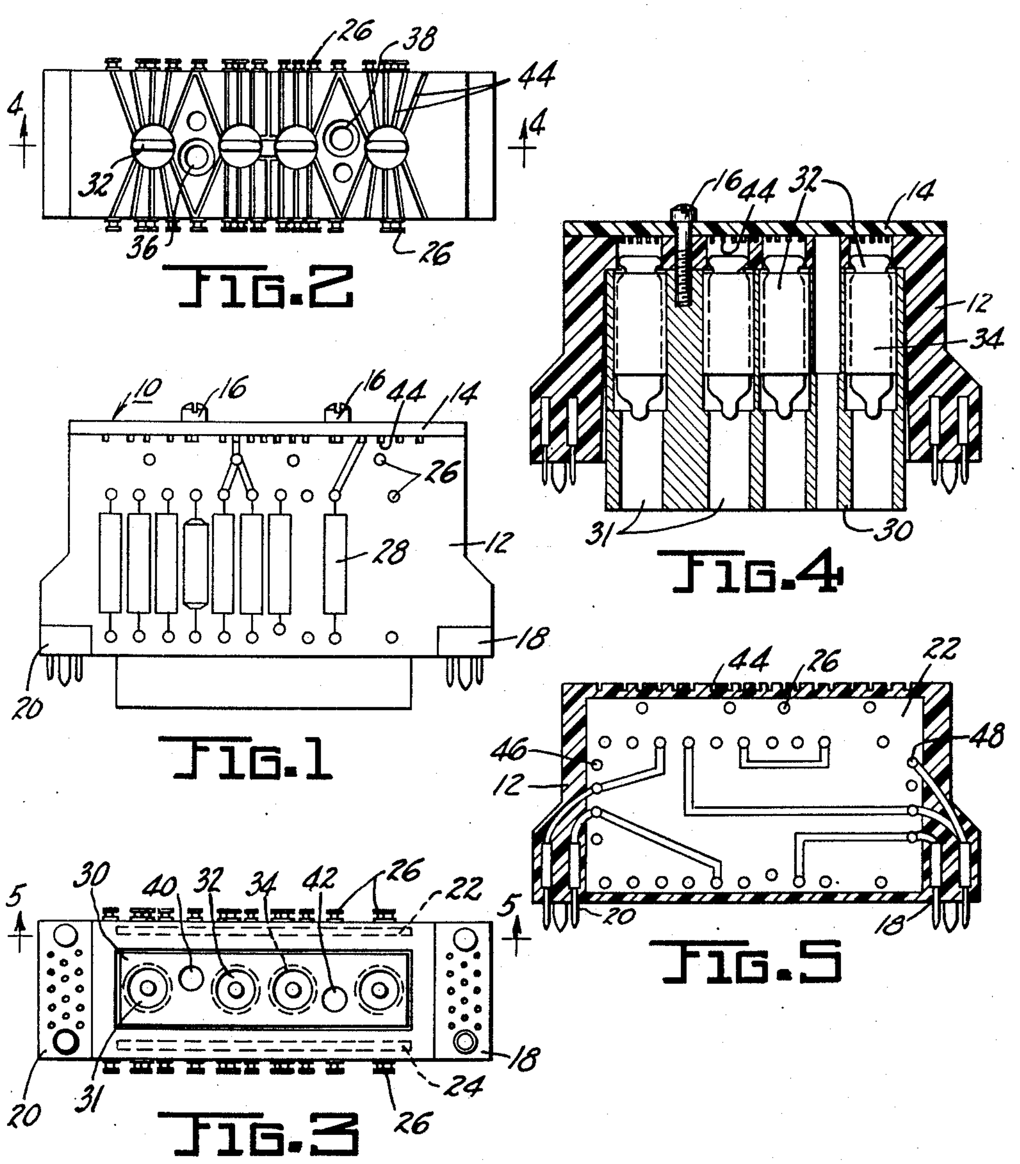
Figure 1 is a side view of a plug-in unit embodying our invention.
Figure 2 is a top view of the unit of Figure 1 with top removed to show the detail of conductor channels and passages for mounting bolts.
Figure 3 is a bottom view of the unit of Figure 1 showing details of the tube retaining block and of the plug-in contacts.
Figure 4 is a cross-sectional view taken along line 4—4 of Figure 2 showing the relative positions of the subminiature tubes, the tube retaining block, and the molded plastic casing including the plug-in contacts.
Figure 5 is a cross-sectional view taken along line 5—5 of Figure 3 showing the printed circuit and the manner in which the internal wiring is arranged.

Referring to Figure 1, a plug-in unit is shown generally at numeral 10. This unit consists of a molded plastic base 12 having various electrical components associated therewith and a cover 14 fastened to said base by means of bolts 16. The plastic material used may be any of several commercially available plastic casting compounds having the desired qualities of structural strength, low moisture absorbtion and high dialective strength and resistance to the passage of electrical currents. Molded into base 12 are two plug-in connectors 18, 20 which are of a type commercially available. Embedded in the plastic of base 12 are printed circuits 22, 24 (see Figure 3) to which are attached numerous lugs or connecting pins 26 which project through the sides of base 12 thereby providing means for attaching various electrical components. Figure 1 shows the manner in which resistors and capacitors 28 may be fastened directly to the outside of base 12 by soldering directly to connecting pins 26. This provides a very neat and rigid means for mounting components in that the wire leads are short and each component is held tightly in place against the side of the unit. Servicing is facilitated because it is possible to remove and replace any of the capacitors or resistors without having to throw away the entire unit or chip the faulty component out of the plastic as is often the case when all the components are molded within a unit. Testing is simplified because numerous terminals are made available where they may be contacted with test leads or probes. Base 12 is hollow and contains a metal block 30 in which is drilled a number of holes 31 adapted to receive a plurality of subminiature electron tubes 32. Each of these tubes is held in place by means of a spring sleeve 34. These sleeves serve not only as a means of holding the tubes in position within the block 30, but also as a shock absorbing structure and as a means for transferring heat from the tubes to the metal block. The block 30 is bolted to a heat transferring structure or heat sink (not shown) by means of bolts which are inserted through holes 36 and 38 in the base 12 and corresponding holes 40 and 42 in block 30. Heat generated in tubes 32 is then transferred through the spring sleeves 34 and block 30 to the heat sink where it is dissipated over a large area.

Figure 4 is a cross-sectional view of the plug-in unit showing the physical relationship of the molded plastic components with the metal block and the tubes contained therein. It will be observed that metal block 30 fits into a hollow section of base 10 and is held tightly thereto by means of the bolt 16. Located in each of bores 31 is a subminiature tube 32 mounted in such manner that the terminals project from the top of base 12 so that each terminal may be drawn through one of the grooves 44 formed on the top of the base end connected to the desired connecting pin or lug 26. Spring sleeves 34 aid in holding each tube securely within its respective bore.

In Figure 5 is shown a cross-sectional view of the unit taken along line 5—5 of Figure 3 showing the printed circuit and the internal wiring of the unit. The connectors 18 and 20 are adapted to mate with female connectors mounted on a chassis (not shown). The opposite ends of each of the individual connectors, or as many of said connectors as are required for a given circuit, are wired directly to a series of terminals 46, 48 on the printed circuit 22. Each of these terminals is connected by means of printed conductor to the appropriate lug or connecting pin 26. In this manner a complete circuit may be made from the connectors 18 or 20 to the terminals 46 or 48 and the printed conductor of the printed circuit 22 to one of the pins 26, through an appropriate resistor or capacitor 28 to another pin 26. To this pin may be wired one of the terminals of a tube 32 which has been drawn through one of the grooves 44. Any other terminal of the tube may be wired in a similar manner through either of printed circuits 22 or 24. It will be apparent that no attempt has been made to discuss our invention in terms of a particular circuit, but rather we have shown a general structure embodying our method of mounting components. The arrangement of any unit which must contain a particular circuit must be laid out carefully with the thought of avoiding crossed conductors and of keeping the wiring as short as possible and the required soldering to a minimum. If this is done, a unit will be produced which will be neat, compact, and have excellent heat dissipation qualities and resistance to damage from vibration or shock.

Figure 7:
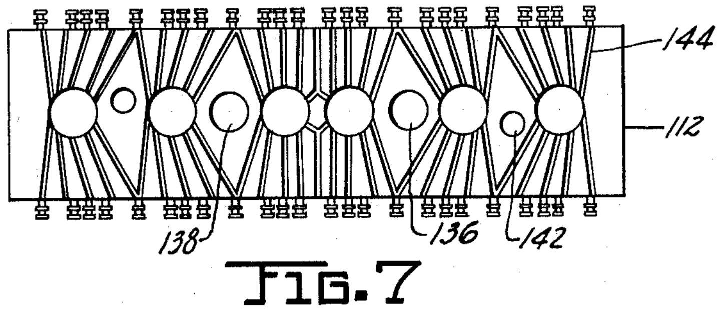
Figure 7 is a top view of the unit of Figure 6 with the top removed to show the detail of conductor channels and passages for mounting bolts.
Figure 6:
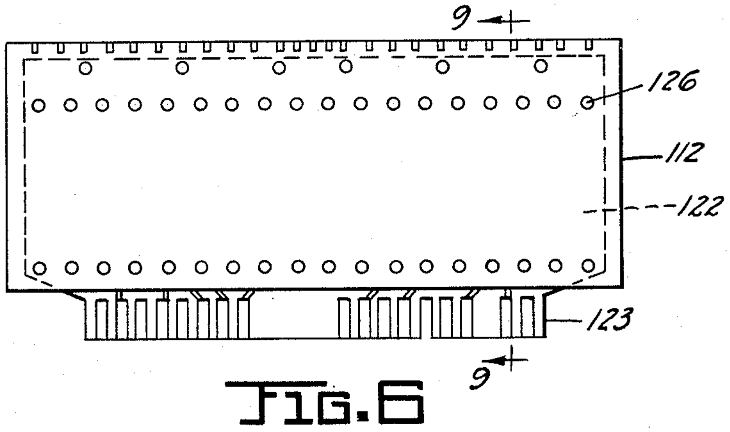
Figure 6 is a side view of a modified form of plug-in unit embodying our invention.
Figure 8:
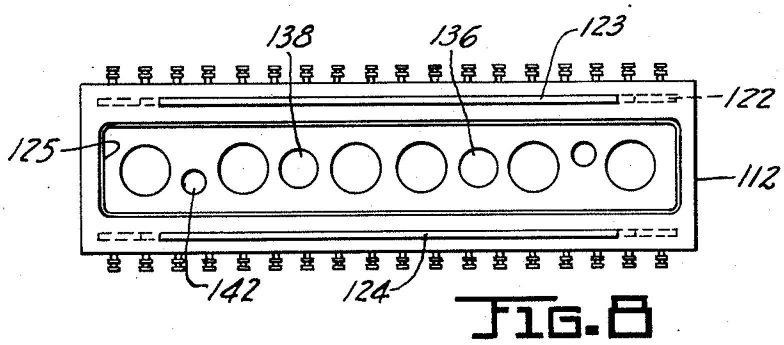
Figure 8 is a bottom view of the unit of Figure 6 showing details of the printed circuit connectors and the tube retaining block.

Figures 6 through 9 show a modification of our invention which makes it possible to reduce the assembly time very significantly. This modification contemplates the use of printed circuits which have connectors attached and which are arranged to plug into female connectors. Figure 6 is a side view of this modified form of my invention showing the molded plastic base unit 112 in which one of the printed circuits 122 is shown with its integral connectors 123 extending from the bottom of the molded unit and in which the remainder of the circuit board is outlined by means of dotted lines. The connecting pins 126 are attached to the printed circuit so as to project through the sides of the plastic unit in the same manner as described above. In Figure 7 is shown the top view of this unit wherein it will be observed that the pattern of grooves 144 and the number of tube openings shown is different from that shown in Figure 2. This will demonstrate the fact that our invention is adaptable to a great number of different circuit configurations involving different numbers of tubes. Figure 8 is a bottom view of the unit of Figure 6 and shows the printed circuits 122 and 124 which project from the molded plastic structure. Also shown is a hollowed section 125 for receiving a metal block which is contained within the hollow interior of unit 112 in the same manner as described above.

Figure 9:
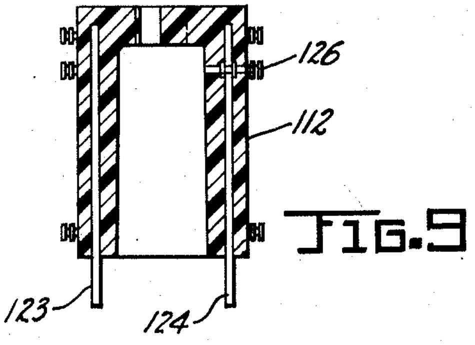
Figure 9 is a cross-sectional view taken along the line 9—9 of Figure 6.

The holes appearing at 136 and 138 are adapted to receive bolts for mounting the metal block to a heat sink, not shown. Figure 9 is a cross-sectional view of the unit of Figure 6 showing the printed circuit boards 123, 124 in relation to the molded unit 112 and the connecting pins 126 which carry the current from the printed circuit to the associated capacitors and resistors, not shown. The passage shown at numeral 142 is adapted to receive a bolt for attaching a cover to the plastic base 112. The modification described in relation to Figures 6 through 9, although requiring a more complex printed circuit having integral connectors, is easier to fabricate because the step of connecting wires from the printed circuit terminals to the connectors is eliminated.

Although only two forms of our invention have been described, modifications may be made to suit requirements. The principles set forth herein are adaptable to circuits involving large numbers of different tube and circuit configurations, and it is believed that one skilled in the art will readily determine the optimum configurations for his particular application.

We claim:

1. In a multi-stage electron tube assembly, a hollow molded plastic member having a hollow interior, at least one printed circuit and external connecting means embedded in said plastic member, connecting pins attached to said printed circuit and extending externally of said plastic member, circuit components connected to said connecting pins, a metal block adapted to fit into the hollow interior of said plastic member, a plurality of passageways in said metal block, a like plurality of electron tubes positioned respectively in said passageways, and means connecting said electron tubes to said connecting pins, and a support member made of heat conducting material positioned within each of said passageways for supporting the electron tube positioned in said passageway.

2. A chassis assembly for a plurality of electron tubes and their associated circuit components comprising a metal block having a like plurality of passageways for receiving said electron tubes, a molded plastic member having a hollow interior for substantially surrounding said metal block, a printed circuit embedded in said member, connecting pins attached to said printed circuit and extending externally of said member, and a support member made of heat conducting material positioned within each of said passageways for supporting the electron tube positioned in said passageway.

3. A chassis assembly as set forth in claim 2, with fastener means made of heat conducting material provided for fastening said metal block to an external heat transmitting structure.

4. In a multi-stage electronic device assembly adapted to be fastened to a heat transmitting structure, the combination of a metal support member, a plurality of electronic devices, a like plurality of passageways provided by said metal support member for receiving said electronic devices, a spring sleeve member made of heat conducting metal positioned at each of said passageways for contacting and holding one of said electronic devices in its respective passageway, a plastic member having a hollow interior cavity for substantially surrounding said metal support member, connecting pins extending externally of said plastic member, circuit components attached to said connecting pins, male connectors molded into said plastic member and connected to said circuit components, a plastic cover for said plastic member, and fastener means made of heat conducting material for securing said metal support member to said heat transmitting structure.

5. In a multi-stage electronic device assembly adapted to be fastened to a heat transmitting structure, a heat conductive metal member, a plurality of electronic devices, a like plurality of passageways provided by said metal member for receiving said electronic devices, a spring sleeve made of heat conducting material for holding each of said tubes in its respective passageway, a plastic support member having a hollow interior cavity for containing and substantially surrounding said metal member, connecting pins extending externally from said plastic support member, circuit components attached to said connecting pins, a plastic cover for said support member, and fastener means made of heat conductive material for securing said metal member to said heat transmitting structure.

6. In an electronic device assembly adapted to be fastened to a heat transmitting structure, a support member made of heat conducting metal, a plurality of electronic devices, with said support member including a support position provided for receiving each of said devices, a spring sleeve made of heat conducting material for holding each of said devices at one of said respective support positions, a plastic member having a hollow interior for substantially surrounding said metal support member, connecting pins extending externally of said plastic member, circuit components attached to said connecting pins, fastener means made of heat conducting material for securing said metal support member to said heat transmitting structure, and a top member made of electrically insulating material for covering said plastic member.

References Cited in the file of this patent

UNITED STATES PATENTS

| | | |
|---|---|---|
| 2,499,589 | Kennedy | Mar. 7, 1950 |
| 2,590,821 | Kiser | Mar. 25, 1952 |

FOREIGN PATENTS

| | | |
|---|---|---|
| 144,122 | Switzerland | Mar. 2, 1931 |